April 15, 1969   E. H. RUSCHER   3,439,307
ELECTRICAL SWIVEL CABLE CONNECTOR
Filed Aug. 18, 1966

INVENTOR.
EARL H. RUSCHER

United States Patent Office 3,439,307
Patented Apr. 15, 1969

3,439,307
ELECTRICAL SWIVEL CABLE CONNECTOR
Earl Hugh Ruscher, 7655 Rome Oriskany Road,
Rome, N.Y. 13440
Filed Aug. 18, 1966, Ser. No. 573,320
Int. Cl. H01r 35/00
U.S. Cl. 339—8                         8 Claims

ABSTRACT OF THE DISCLOSURE

A swivel connection between two multiconductor cables. Each cable has an end molded in a block of insulation, one having carbon plunger contacts, and the other contact rings to permit swiveling. One block has secured thereto a shell which encompasses the other block for rotation and has a bearing with the adjacent cable.

---

This invention pertains to new and useful improvements in electrical connectors of the swivel type, and the principal object of this invention lies in the simplicity of a workable design particularly in the easily replaceable spring and brush contact assembly.

The device consists essentially of two molded insulation bodies each containing leads from a cable and with the leads being connected, in one body, to annular rings exposed on a surface thereof, and in the other body to spring projected slidable carbon brush elements, these being arranged to remain in slidable contact with the rings should the bodies rotate. A shell is secured to one body and extends over the other to permit and maintain this rotative relationship. Adjacent the end of the encompassing shell is a ball bearing, fitted on the cable.

An object of this invention is to provide a suitable swivel connector for a three conductor cord, a two conductor cord, and one conductor lead cord.

Figure 2:
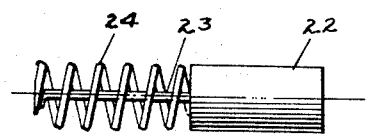
FIGURE 2 is a larger scale view of the spring and brush contact assembly.
Figure 1:
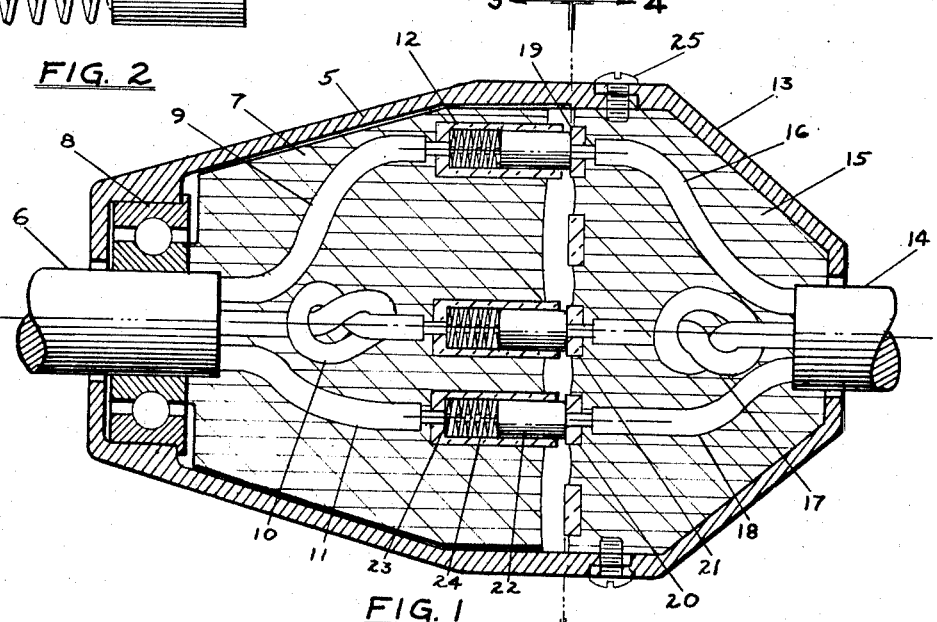
FIGURE 1 is a longitudinal cross section of the swivel connector.
Figure 3:
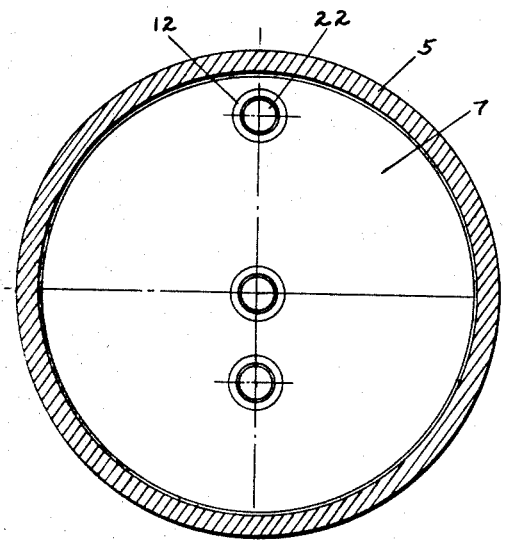
FIGURE 3 is a cross sectional view at the line 3—3 in FIGURE 1.
Figure 4:
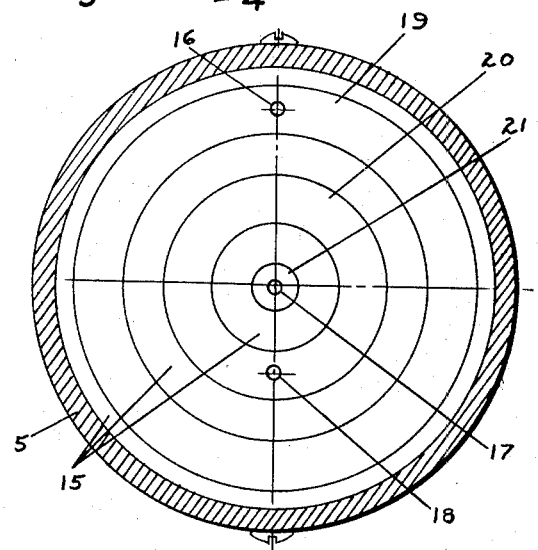
FIGURE 4 is a cross sectional view at the line 4—4 in FIGURE 1.

Referring to the drawings, the swivel connector is comprised of an outer cylindrical shell 5 which has a clearance hole in the end through which cord 6 passes into the non conducting member 7. The outer shell 5 is also recessed at this end to except a ball bearing 8 which closly fits the cord 6 with the non conducting member 7 resting against the inner race of the bearing 8 and the outer race of the bearing 8 fitting snugly into the outer shell 5, the axial rotation of the non conducting member 7 is made easier. Also the thrust loads encountered when pulling the cord 6 while twistings are transferred through the bearing 8 to the outer shell 5. The nonconducting member 7 follows the same general cylindrical contour of the outer shell 5 and at assembly has some clearance between it and the inner bore of the outer shell 5, this is to allow free axial rotation of the nonconducting member 7. The three conductors 9, 10, and 11 pass through the nonconducting member 7 and are attached to cylindrical conducting cups 12 which are embedded in the nonconducting member 7. The center conductor 10 is twisted in an "underwriters knot" to prevent the cord 6 from pulling out of the nonconducting member 7. The other half of the swivel connector consists of a cylindrical member 13 which has a clearance hole in the end through which cord 14 passes into a nonconducting material 15. The three conductors 16, 17, and 18 pass through the nonconducting material 15 and are attached to annular concentric conducting rings 19, 20, and 21 which are embedded in the nonconducting material 15. The center conductor 17 is twisted in an underwriters knot.

The contact assembly as pictured in FIGURE 2 consists of a brush 22 whose lead wire 23 passes through a spring 24 and is attached to the spring 24 at its far end. This contact assembly is inserted in each of the conducting cups 12 and the two parts of the swivel connector are fastened together with screws 25 passing through the outer shells 5 and 13 and into the nonconducting material 15.

What is claimed as new is:

1. A swivel connection between cable ends comprising two cables each having plural conductors with the ends thereof secured in adjacent bodies of insulation and electrically connected to separate conductive contacts arranged for mating contact between the bodies; the contacts of one of said bodies being formed of concentric rings, and the other of spring biased plunger elements; a shell secured to and covering at least part of one of said bodies and encompassing the other so as to permit swiveling of the said other body relative to the remaining body with said contacts remaining in contact during such swiveling; and a bearing between the end of the encompassing shell portion and the adjacent cable.

2. The structure of claim 1 wherein there are three conductors in each cable, each secured to a respective contact.

3. The structure of claim 1 wherein the material of the bodies comprises solidified casting insulation material embedding the respective conductors therein.

4. The structure of claim 3 wherein one conductor in each body has an underwriter's knot embedded therein.

5. The structure of claim 1 wherein the plunger elements are carbon brushes.

6. The structure of claim 1 wherein said shell is formed of two parts, the encompassing portion forming one part and being removably attached to the other part.

7. The structure of claim 1 wherein the spring biased plunger elements include a tubular casing which contains a plunger element and a coil spring biasing the plunger element outwardly of said casing.

8. The structure of claim 1 wherein said bearing comprises a ball bearing fitted between said shell end and said cable.

References Cited

UNITED STATES PATENTS

| | | |
|---|---|---|
| 1,975,964 | 10/1934 | Mayhew. |
| 2,231,366 | 2/1941 | Mehr. |
| 2,715,713 | 8/1955 | Seim. |
| 2,766,625 | 10/1956 | Swanson _____ 339—8 |

FOREIGN PATENTS 458,129    7/1950    Italy.

RICHARD E. MOORE, *Primary Examiner.*